United States Patent
Brooks et al.

(10) Patent No.: US 9,322,994 B2
(45) Date of Patent: Apr. 26, 2016

(54) PLANAR LIGHTWAVE CIRCUIT AND A METHOD FOR ITS MANUFACTURE

(71) Applicant: ColorChip (Israel) Ltd., Yokneam (IL)

(72) Inventors: David Brooks, Hod Hasharon (IL); Rodi Grimberg, Kfar Saba (IL); Eli Arad, Hod Hasharon (IL)

(73) Assignee: COLORCHIP (ISRAEL) LTD., Yokneam (IL)

( * ) Notice: Subject to any disclaimer, the term of this patent is extended or adjusted under 35 U.S.C. 154(b) by 0 days.

(21) Appl. No.: 14/368,809

(22) PCT Filed: Dec. 27, 2012

(86) PCT No.: PCT/IB2012/057746
§ 371 (c)(1),
(2) Date: Jun. 26, 2014

(87) PCT Pub. No.: WO2013/098769
PCT Pub. Date: Jul. 4, 2013

(65) Prior Publication Data
US 2015/0117812 A1    Apr. 30, 2015

Related U.S. Application Data

(60) Provisional application No. 61/580,307, filed on Dec. 27, 2011.

(51) Int. Cl.
*G02B 6/32* (2006.01)
*G02B 6/12* (2006.01)
*G02B 6/42* (2006.01)
(Continued)

(52) U.S. Cl.
CPC .. *G02B 6/12* (2013.01); *G02B 6/26* (2013.01); *G02B 6/30* (2013.01); *G02B 6/4225* (2013.01); *G02B 6/4227* (2013.01); *G02B 6/4239* (2013.01); *G02B 6/4292* (2013.01);
(Continued)

(58) Field of Classification Search
USPC .......................................................... 385/50
See application file for complete search history.

(56) References Cited

U.S. PATENT DOCUMENTS

2003/0081930 A1* 5/2003 Filhaber ................. C03C 27/06
                                                                385/147
2006/0008199 A1* 1/2006 Glebov et al. ................... 385/15
(Continued)

FOREIGN PATENT DOCUMENTS

| | | |
|---|---|---|
| CN | 1967848 | 11/2006 |
| EP | 0693698 A2 | 1/1996 |
| WO | 2007050432 A1 | 5/2007 |

OTHER PUBLICATIONS

International Search Report mailed on Apr. 8, 2013 for PCT/IB2012/057746 filed on Dec. 27, 2012.
Chinese Office Action dated Jun. 3, 2015 for Application No. 2012800679666 filed Jul. 24, 2014.

*Primary Examiner* — Eric Wong
(74) *Attorney, Agent, or Firm* — A.C. Entis-IP Ltd.

(57) ABSTRACT

A planar lightwave circuit (PLC) is disclosed having fixed thereto a coupling tube for coupling an optical fiber. The PLC comprises a planar optical substrate having in it an optical waveguide having an optical aperture located on an edge surface of the optical substrate and a tube formed having a lumen dimensioned to receive an optical fiber ferrule and an edge surface fixed to the substrate edge surface so that a cross section of the lumen at the edge surface is aligned with the optical aperture.

20 Claims, 8 Drawing Sheets

(51) Int. Cl.
*G02B 6/30* (2006.01)
*G02B 6/26* (2006.01)
(52) U.S. Cl.
CPC ......... *G02B6/4246* (2013.01); *Y10T 29/49004* (2015.01); *Y10T 29/49016* (2015.01)

(56) References Cited

U.S. PATENT DOCUMENTS

2006/0215963 A1    9/2006  Hamano
2007/0165985 A1*   7/2007  Rose et al. ...................... 385/88

\* cited by examiner

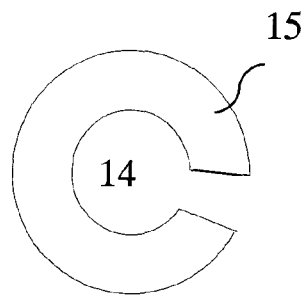
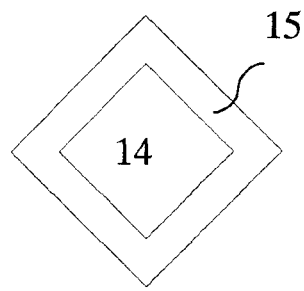
Fig. 6A  Fig. 6B
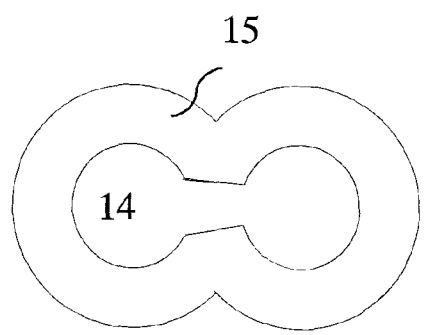
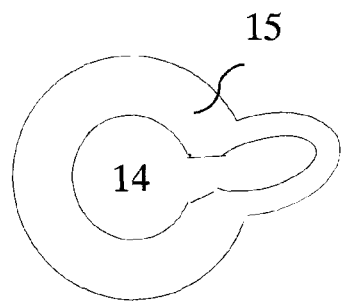
Fig. 6C  Fig. 6D
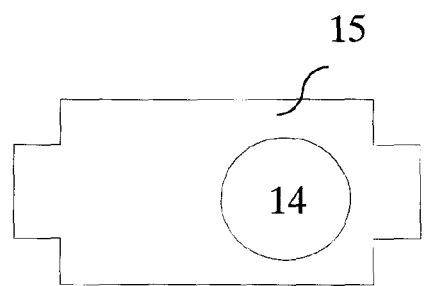
Fig. 6E

PLANAR LIGHTWAVE CIRCUIT AND A METHOD FOR ITS MANUFACTURE

RELATED APPLICATIONS

The present application is a US National Phase of PCT Application No. PCT/IB2012/057746, filed on Dec. 27, 2012, which claims the benefit under 35 U.S.C. 119(e) of U.S. Provisional Application 61/580,307 filed on Dec. 27, 2011, the disclosure of which is incorporated herein by reference.

TECHNICAL FIELD

Embodiments of the invention relate to a planar lightwave circuit (PLC) and a method for its manufacture and coupling to an optical fiber.

BACKGROUND

An aspect of optical communication systems relates to connecting optical fibers to other optical components (for example transceivers comprised in the systems). Optical fibers are connected to optical components using connectors that serve to mechanically couple and align the fibers' cores with other optical components so that light can efficiently pass between the fibers and the optical components. Various types of optical connectors and methods of connecting an optical fiber to another optical component are known.

Conventionally optical connectors are connected one to the other by positioning a protruding portion of a male connector within a compatible cavity of a matching female connector. The protruding portion of the male connector holds an optical fiber ferrule. An optical fiber ferrule is an elongated sleeve often about 1.25 mm to 2.5 mm in external diameter surrounding a tip of an optical fiber. The ferrule provides the tip with some rigidity, and is sometimes made of ceramic (zirconia) or metal (stainless alloy). The cavity in the female connector (sometimes called "sleeve") is normally dimensioned to accept and position the ferrule. The male and female connectors normally also comprise structural features to allow easy attachment and/or detachment one from the other and for securing them when connected in a proper position.

Some types of optical components, for example optical transceivers, are classified by a method or type of fiber connector that is used to couple the components to an optical fiber.

For example, one group of transceivers uses a method often termed a "pigtail method" for coupling fibers to the transceivers. Transceivers of this group are often referred to as pigtail transceivers. In the pigtail method one end of a short length of an optical fiber, referred to as a "pigtail", is permanently coupled to a component of a transceiver. The other end of the fiber is usually equipped with a male connector comprising an optical fiber ferrule to be connected to a pluggable female connector.

Transceivers in a second group of transceivers, often referred to as pluggable transceivers, comprise connectors that match connectors on electronic host cards. A pluggable transceiver is attached to a host card by plugging the transceiver's electronic connectors into the matching connectors on the card. When "plugged in", the transceiver is connected to various electronic and/or optical components comprised in the host card. At least one of the components comprised in the card to which the transceiver is attached provides an intervening connection to an optical fiber from which the card receives and/or to which the card transmits optical signals.

SUMMARY

An aspect of some embodiments of the invention relates to providing a planar lightwave circuit (PLC) connected directly to an optical fiber connector that enables easy connecting of an optical fiber to the PLC and easy disconnecting thereof. The connector comprises a hollow tube having a lumen dimensioned to receive an optical fiber ferrule comprised in a conventional optical fiber connector. The hollow tube, hereinafter also a "coupling tube" or "sleeve" is directly fixed to a surface of the PLC in alignment with an optical aperture on the surface. Optionally, the aperture is an aperture of an optical waveguide formed within the PLC.

In embodiments of the invention, the coupling tube is fixed by an adhesive located between the PLC surface (at times referred to as the PLC facet) and an edge surface of the tube wall. The adhesive is substantially absent from a region of the PLC surface which is within a cross section of the coupling tube lumen. As a result, the adhesive does not degrade transmission of light via the optical aperture between the waveguide in the PLC and an optical fiber comprised in a fiber ferrule seated in the coupling tube.

An aspect of some embodiments of the invention relates to providing a method of manufacturing a PLC having a coupling tube attached directly to its surface.

In some embodiments of the invention the method comprises a step of positioning the connector on the PLC surface at an aligned position. This step may comprise coupling an optical fiber to the connector and transmitting light through the optical fiber to or from the waveguide within the PLC, and determining an amount of the light transmitted. The coupling tube may be fixed to the PLC surface at a location for which light transmission is measured to be a maximum amongst a plurality of tested positions.

In some embodiments, the method comprises fixing the connector to the PLC using an adhesive, which is selected to have a viscosity such that when applied to the interface in a predefined amount, the adhesive selectively locates in the interface and is essentially absent from a portion of the PLC's surface that is within the cross section of the connector's lumen adjacent the PLC surface. This may include matching the viscosity with a roughness of the connector's surface at the interface.

Accordingly there is provided in accordance with some embodiments hereof, a PLC comprising: a planar optical substrate having an edge surface and comprising an optical waveguide having an optical aperture located on the edge surface; and a tube formed having a lumen dimensioned to receive an optical fiber ferrule and an edge surface fixed to the substrate edge surface so that a cross section of the lumen at the edge surface of the tube is aligned with the optical aperture.

In some embodiments, the PLC also comprises a support substrate attached to the planar optical substrate such that an edge surface of the support substrate forms an extension of the edge surface of the planar optical substrate. The tube may then be fixed to both the edge surface of the support substrate and the edge surface of the planar optical substrate.

In some embodiments the tube is fixed to the edge surfaces by an adhesive having a viscosity at the time of application that is matched to a roughness of the edge surface of the tube. For example, where the roughness is about 10 μm, the viscosity may be between 200-300 mPa·s. At times, at least a portion of the edge surfaces, which is within the cross section of the tube's lumen and adjacent the optical aperture, is essentially devoid of the adhesive.

In some embodiments, the tube may be coupled to the PLC by: positioning the tube and the planar optical substrate respective each other at an aligned position wherein an edge surface of the tube is facing the edge surface of the planar optical substrate such that a cross section of the lumen at the edge surface of the tube is aligned with the optical aperture; and fixing the tube to the edge surface at the aligned position.

Optionally, a support substrate is attached to the planar optical substrate such that an edge surface of the support substrate forms an extension of the edge surface of the planar optical substrate.

In accordance with some embodiments, fixing the tube to the edge surface of the planar optical substrate at the aligned position comprises: applying an adhesive to an interface zone between the tube and the edge surface of the planar optical substrate, wherein the adhesive is applied at a viscosity that is matched to the roughness of the edge surface of the tube at the interface zone such that when the amount is applied to the interface zone the adhesive is drawn into the interface zone.

Optionally, positioning the tube and the planar optical substrate respective each other at an aligned position comprises: positioning an optical fiber having an optical fiber ferrule in the lumen of the tube; placing the tube and planar optical substrate at one or more positions respective each other wherein the tip of the ferrule is aligned with the optical aperture in the edge surface of the planar optical substrate; and directing light through one end of the optical fiber and waveguide to the other end and measuring a property of light transfer to the other end for each of the one or more positions.

In some embodiments, positioning the tube and the planar optical substrate respective each other at an aligned position comprises selecting a position among the plurality of positions according to the measured property of light transfer and setting the selected position to be the aligned position. For example, the selected position might be selected to have measure property of light transfer above a predefined value and/or a maximal value amongst a plurality of tested positions.

This Summary is provided to introduce in a simplified form a selection of concepts that are further described below in the Detailed Description. This Summary is not intended to identify key features or essential features of the claimed subject matter, nor is it intended to limit or define the scope of the claimed subject matter.

BRIEF DESCRIPTION OF FIGURES

Non-limiting examples of embodiments of the invention are described below with reference to figures attached hereto. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIG. 1A shows an isometric view of the PLC; FIG. 1B depicts a bottom view; FIG. 1C shows one lateral view perpendicular to the interface between the tube and planar optic substrate of the PLC; and FIG. 1D shows a back view taken from the side of the PLC to which the tube is connected.

FIGS. 6A-6E schematically depicts some examples for a cross section of a tube and its lumen.

DETAILED DESCRIPTION

Figure 1A:
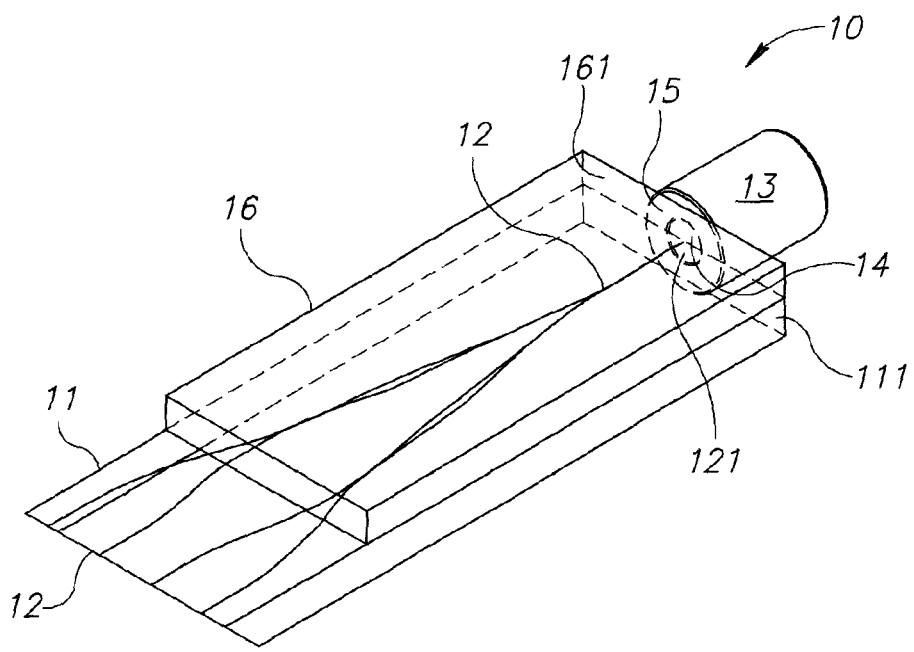
FIGS. 1A-1D schematically show a PLC having an optical connector directly connected to its edge surface.
Figure 1B:
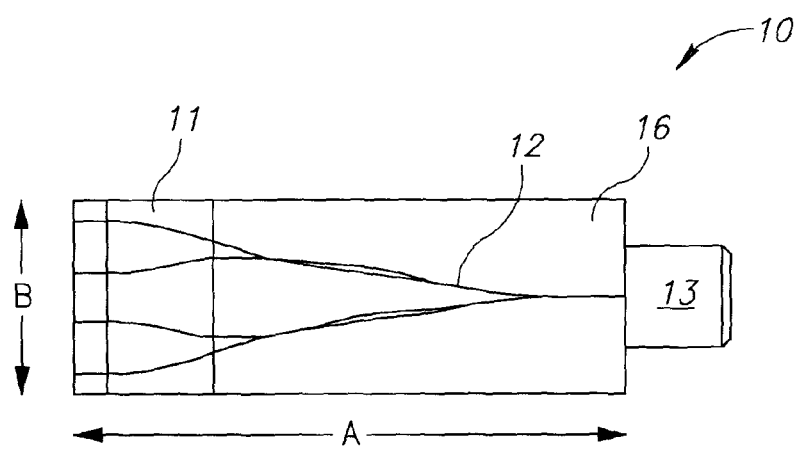
Figure 1C:
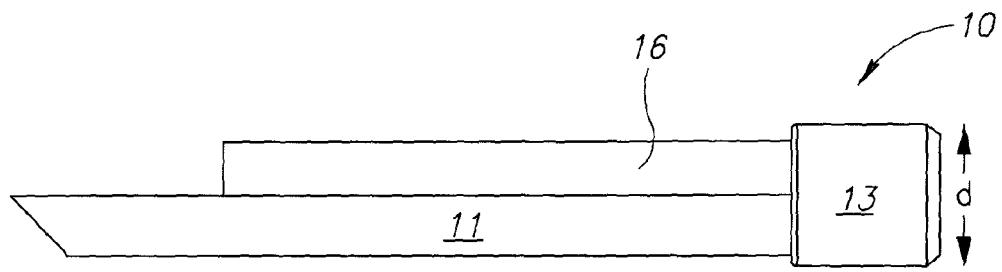

FIGS. 1A-1D show a PLC 10. As seen, PLC 10 comprises a planar optical substrate 11 having an edge surface 111. The planar optical substrate is formed from any suitable optical material capable of efficient light conduction. Examples for "optical substrate(s)" include glass and glass like synthetic material, quartz, silicon and any other rigid material that is transparent to light.

Planar optical substrate 11 comprises a waveguide 12 embedded therein, the waveguide having an aperture 121 in edge surface 111. The waveguide may be incorporated into the planar optical substrate in any known methodology, including without limitation the deposition of atoms (e.g. silver atoms) by methods, including ion exchange or silica on silicon and polymer waveguides. The path of waveguide 12 in the planar optical substrate 11 as shown comprises splitting (and having a single optical aperture 121 in edge surface 111. However, embodiments of the invention are not limited to a specific path or shape of the waveguide. Planar optical substrate 11 may for example comprise a plurality of waveguides 12 having one or more apertures in one or more edge surfaces of the planar optical substrate.

Figure 1D:
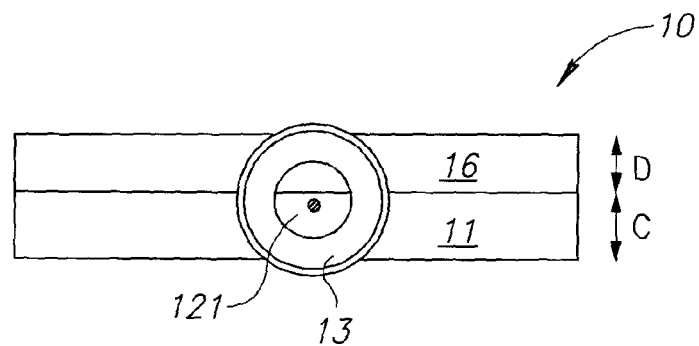

Planar optical substrates are sometimes shaped as plates often being about 5-100 mm long (marked as "A" in FIG. 1B) and 2-20 mm wide (marked "B" in FIG. 1B) and 0.5 mm-2 mm thick in a cross section taken perpendicularly to the planar surface of the planar optical substrate (marked "C" in FIG. 1D). Waveguide aperture 121 may be found 1 μm-40 μm below the surface of planar optical substrate 11.

Planar optical substrate 11 is shown in FIGS. 1A-1D together with a support substrate 16 attached thereto. Support substrate 16 may be used to extend edge surface 111 to provide a larger surface for the binding of coupling tube. In the aforementioned FIGS. 1A-1D, support substrate 16 is a planar optical substrate having an edge surface 161. Edge surface 161 forms an extension of edge surface 111 of the planar optical substrate 11, and tube 13 is fixed to both surfaces.

In some cases, edge surface 161 together with edge surface 111 will form a combined edge surface (the "combined edge surface") that is dimensioned such that at least 90% or at least 95% of the tube's edge surface 15 will be in contact with the combined edge surface when fixed in position. At times the combined edge surface is dimensioned to be about the same as or even larger than the tube's edge surface 15 around optical aperture 121. For example, in FIG. 1D dimension "C" is the width of edge surface 111, dimension "D" is the width of edge surface 161, and the combined edge surface width D+C is about equal to or even longer than dimension "d" being the width of tube 13 in FIG. 1C. Where tube 13 has an external circular cross section (as exemplified in FIGS. 1A-1D) the combined edge surface may extend around aperture 121 by at least the external radius of the tube's edge surface 15, and may exceed it in one or more directions by at least 1 μm or at least 1 mm.

Support surface 16 may also provide rigidity and durability to the planar optical substrate 11. Support substrate 16 may be made of the same material as planar optical substrate 11 or from a different material for example with similar refractive index and thermal expansion coefficient.

As seen especially in FIGS. 1A and 1D, tube 13 is formed having a lumen 14. Tube 13 is fixed to the edge surface 111 via the tube's edge surface 15, such that a cross section of lumen 14 at edge surface 111 is aligned with the optical aperture 121.

While tube 13 and lumen 14 are shown with an essentially cylindrical shape, embodiments of the invention are not limited to such shapes. The term "tube" may be taken to mean any structure formed having a lumen extending through it and having openings in opposing ends, regardless of the shape of the structure as a whole. Lumen 14 may have any cross section capable of receiving a protruding portion of an optical fiber connector 20 and holding it in place such as to allow light conduction between an optical fiber in the connector (not shown) to waveguide 12. Tube 13 may have any cross section, whether the same as or different from that of lumen 14, and it may have a plurality of lumens for fiber connectors (for example similar to the standard MTP/MPO connectors) or a single lumen.

In this regard attention is drawn to FIGS. 6A-6E, depicting some non-limiting examples for tube 13 and lumen 14, shown as a cross section taken at the interface with edge surface 111. As seen in these drawings, the cross section of lumen 14 at edge surface 111 may be have any shape having a centroid situated within the cross section of the aperture 121.

Optionally tube 13 may not completely close around lumen 14 (e.g. FIG. 6A), as long as it allows for the positioning and securing of an optical fiber ferrule to the PLC. It is noted that tube 13 is not limited to a cylindrical exterior, as exemplified in FIGS. 6B-6C.

Figure 2:
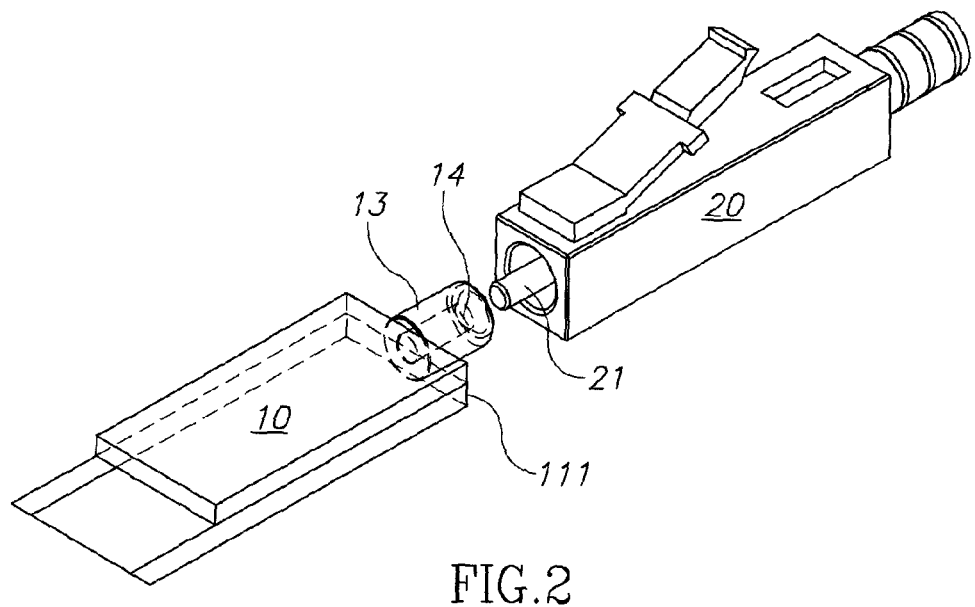
FIG. 2 schematically depicts the PLC shown in FIGS. 1A-1D, being connected to an optical fiber comprised in an example of a conventional optical connector.

FIG. 2 depicts tube 13 together with an example of a male optical fiber connector 20. Tube 13 may thus be configured to receive in lumen 14 a protruding portion of ferrule 21 of an optical fiber connector 20. As known in the art, an external diameter of a ferrule diameter is defined by a common standard of Ø1.2485-Ø1.2495 mm. In cases where tube 14 is dimensioned to receive a ferrule conforming to the current standard, the internal cross section of the lumen may be larger by about 0.5-1.5 μm to allow easy attachment of such a ferrule (with the allowed manufacturing tolerance). When connected, ferrule 21 may come to contact with edge surface 111 of planar optical substrate 11, with the tip of an optical fiber that is held in ferrule 21 (not shown) coming to abutting contact with optical aperture 121 in the edge surface.

Tube 13 may be configured to allow easy attachment and/or detachment and/or securing of an optical fiber connector without the use of special tools or effort. Examples for such configurations are well known. Sometimes a male connector that is attached to the tube provides a mechanism for securing it into position such as by snapping into the tube and/or for latching onto it and/or for screwing on or twisting onto the tube. The tube is often configured to connect to the connector by having complementary grooves or slots. Examples for such mechanisms include twisting-on mechanisms (e.g. as found in ST connectors), screw-on mechanisms (e.g. as found in FC connectors), snap-in mechanisms (as found for example in SC and LC connectors), etc.

Tube 13 may comprise or be made of any material known in the art for positioning and/or securing of an optical fiber connector or an optical fiber ferrule, including for example ceramic zirconium.

Figure 7:
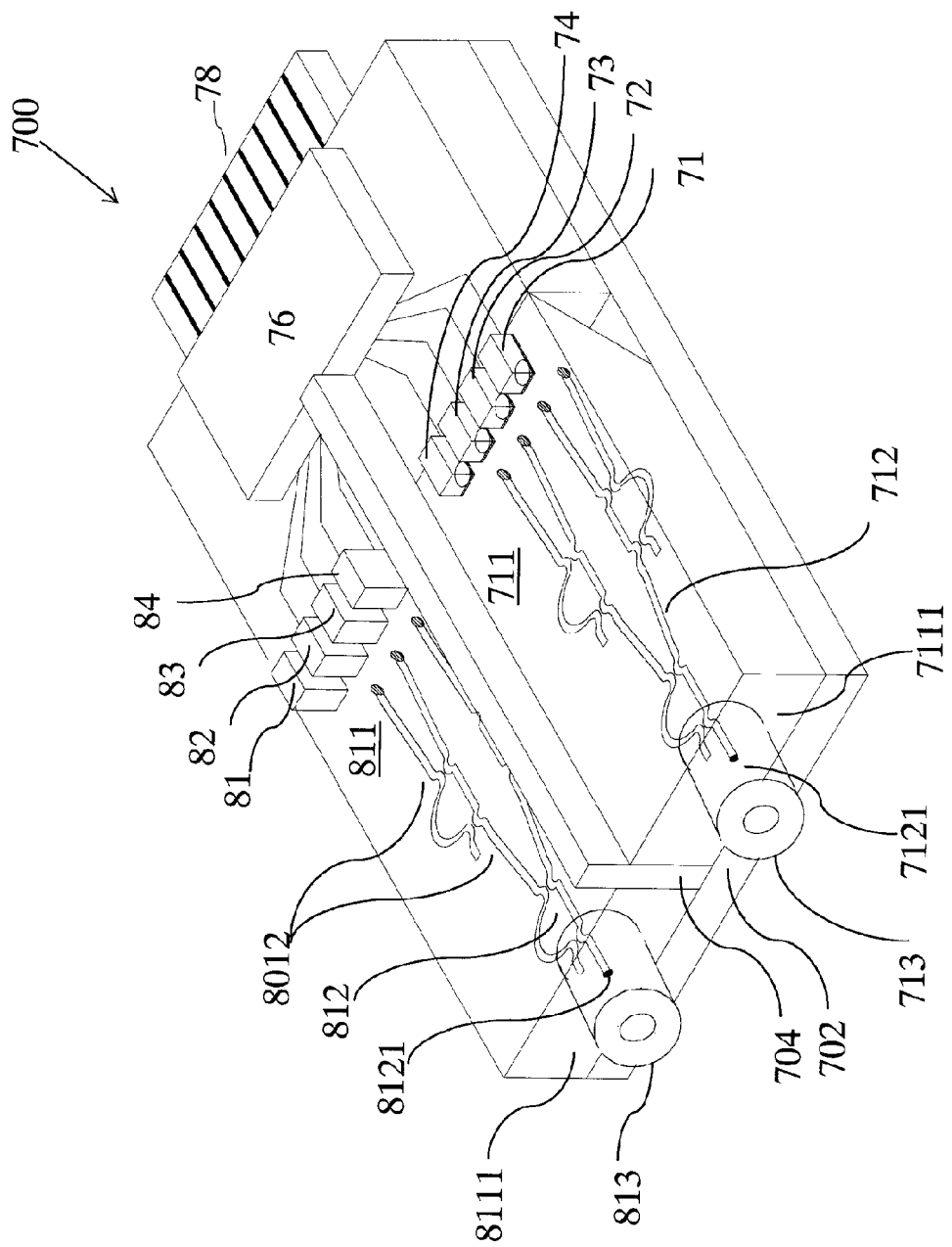
FIG. 7 schematically shows a PLC connected to two tubes, the PLC comprising a transceiver comprising a receiving optical sub-assembly (ROSA) and a transmitting optical sub-assembly (TOSA).

An example for a transceiver comprising a PLC having a coupling tube connected thereto is depicted in FIG. 7. Quad small form-factor pluggable (QSFP) transceiver 700 comprises receiving optical sub-assembly (ROSA) 711 and transmitting optical sub-assembly (TOSA) 811 optionally mounted to a support base 702 having a conducting panel 704 located between the ROSA and TOSA to reduce mutual electromagnetic interference. Each of ROSA 711 and TOSA 811 or both together may be a planar optical substrate. ROSA 711 comprises a waveguide 712 having an optical aperture 7121. TOSA 811 comprises a waveguide 812 having an optical aperture 8121. As seen in FIG. 7 QSFP 700 comprises coupling tubes 813 and 713 fixed near optical apertures 8121 and 7121, respectively, allowing coupling of an optical fiber to the apertures, essentially as described above. It is noted that each of coupling tubes 713 and 813 may be fixed to ROSA 711 and TOSA 811, respectively, before or after the TOSA and ROSA are mounted on support base 702. Additionally or alternatively, ROSA 711 and/or TOSA 811 may be attached to a support substrate (not shown), essentially as described herein with reference to planar optical substrate 11 and support substrate 16. The entire assembly QSFP 700 may be housed inside an MSA (Multi Source Agreement) metal case with standard dimensions. The metal case has the mechanical features to lock male fiber connectors firmly in place when connected to tubes 713 and/or 813 so that edges of optical fibers are butt connected to the PLC surfaces 8111 and/or 7111 while tubes 713 and 813 guarantee that the fiber cores are aligned with optical apertures 8121 and 7121.

A microcontroller 76, is mounted to support base 702, and is connected to laser diodes (LDs) 81, 82, 83 and 84 of TOSA 811 to control generation of optical signals by the LDs in each of waveguides 812 and 8012 for multiplexing and transmission through optical aperture 8121. Optionally microcontroller 76 is coupled to each of the LDs by a different laser diode driver (not shown) that controls current to the LD, and thereby light pulses generated by the LD. The microcontroller is also connected to photo diodes (PDs) 71, 72, 73 and 74 comprised in ROSA 711 to receive electrical signals generated by the PDs responsive to optical signals received by transceiver 700 via optical aperture 7121 that the ROSA demultiplexes. Optionally, microcontroller 76 is coupled to each of the PDs by a different transimpedance amplifier/limiting amplifier (not shown) that receives current signals from the PD and converts it to a shaped voltage signal. A QSFP compliant connector 78 is electrically connected to microcontroller 76 for connecting QSFP 700 to a communication terminal. QSFP 700 may be small enough to be housed in a QSFP compliant housing having length, width and height less than or equal to 70 mm, 18.35 mm and 8.5 mm, respectively.

Figure 3A:
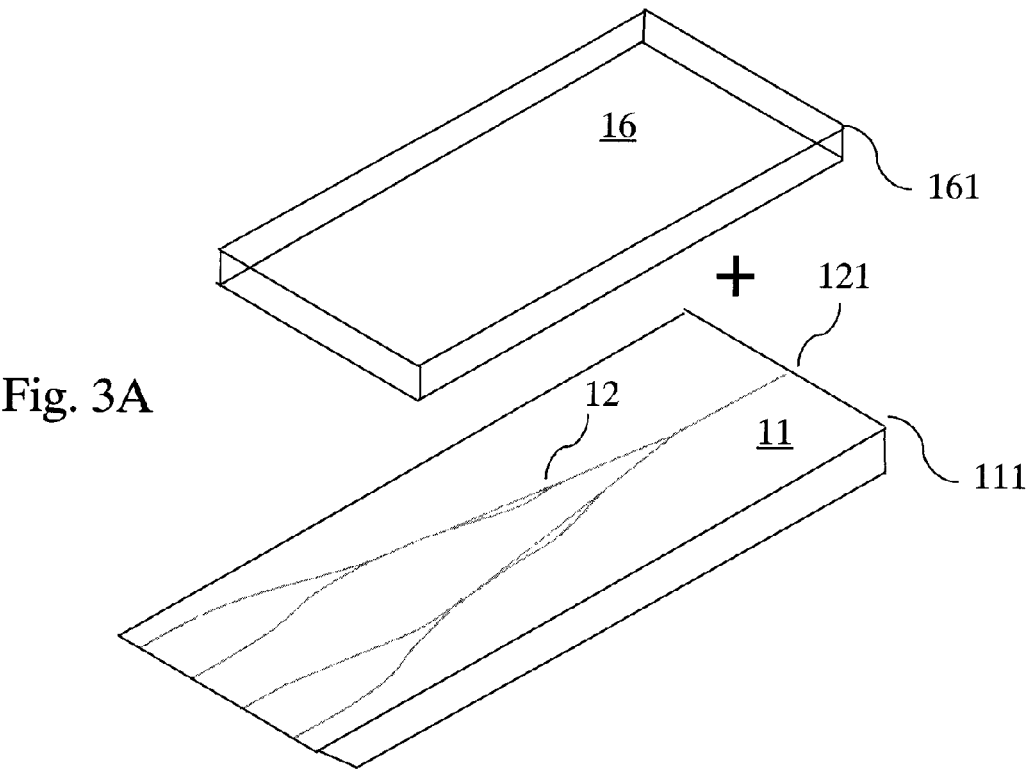
FIG. 3A-3D schematically depicts stages in a method for providing a PLC with an optical connector.
Figure 3B:
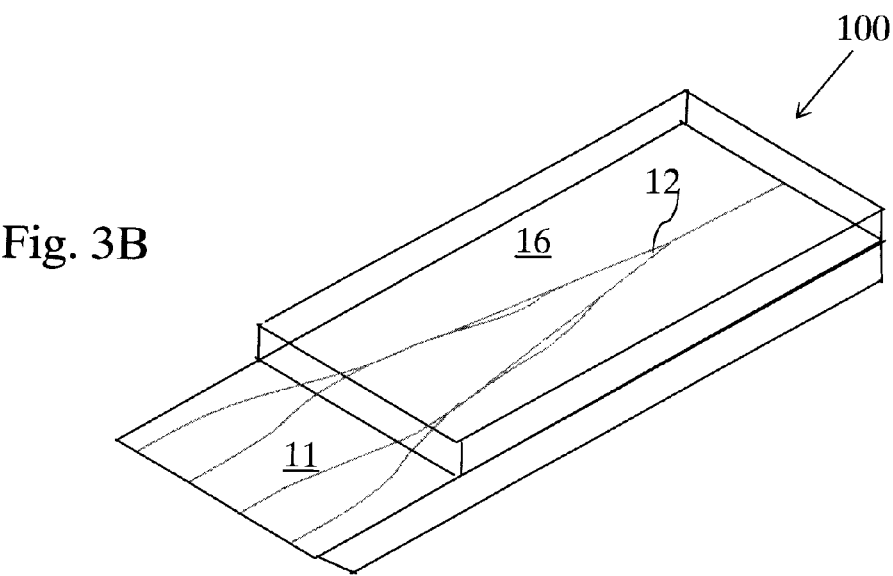
Figure 3C:
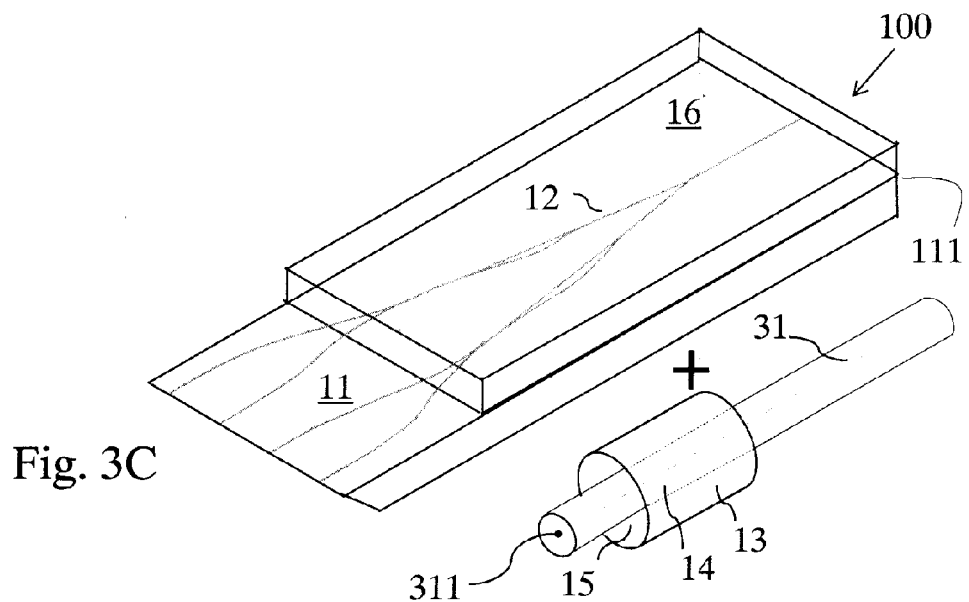
Figure 3D:
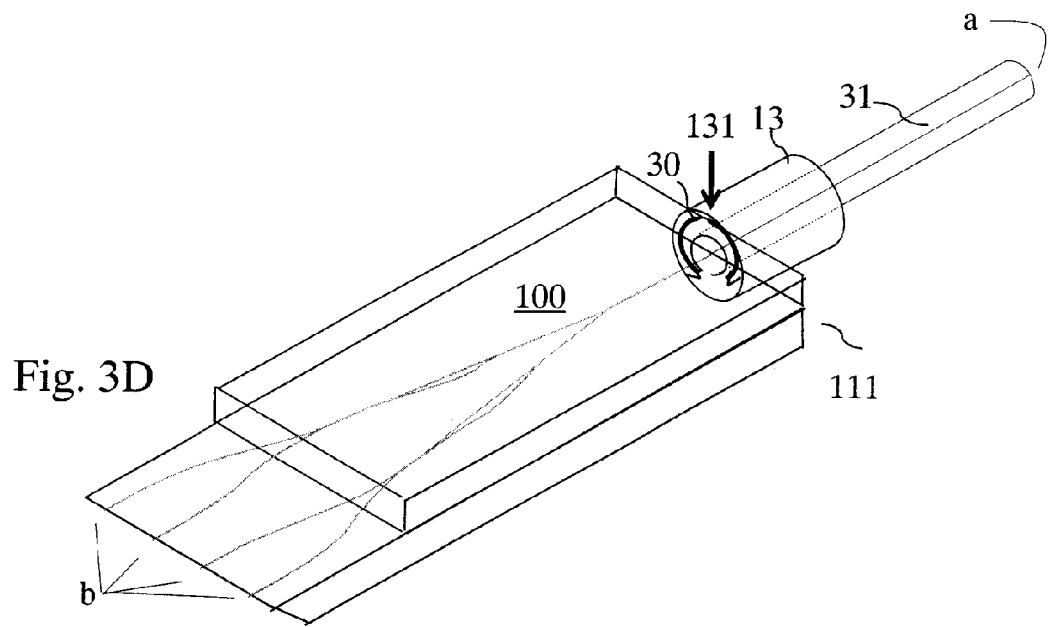
Figure 4:
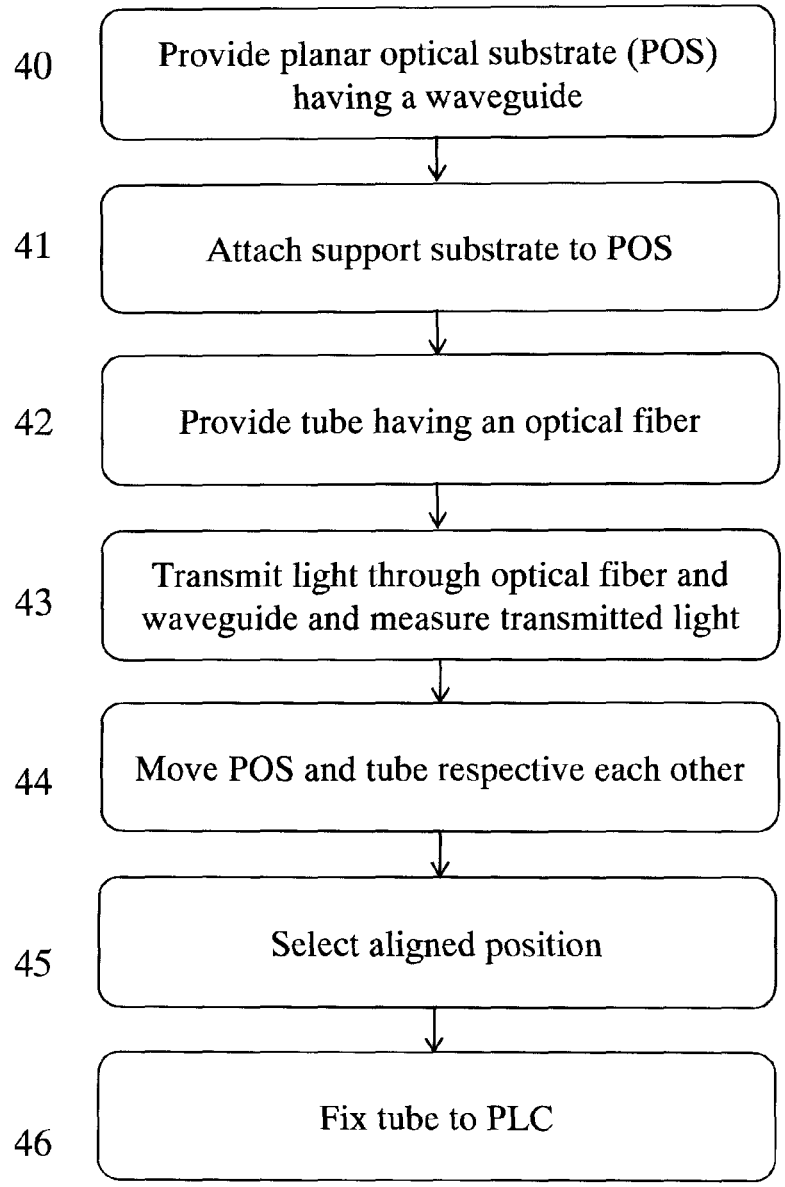
FIG. 4 shows a flowchart summarizing steps in a method for providing a PLC with an optical fiber connector.

FIG. 4 depicts a flow chart describing a method of providing a PLC with a coupling tube. A method of providing a PLC with a coupling tube is also described schematically in FIGS. 3A-3D. Following is a description of some embodiments of the invention in relation to the flow chart and schemes.

In Step 40, a planar optical substrate 11 is provided. As seen in FIG. 3A, planar optical substrate 11 comprises a waveguide 12. Optionally (Step 41 and FIGS. 3A-3B) planar optical substrate 11 is attached to a support substrate 16. Planar optical substrate 11 and support substrate 16 may be attached such that the edge surface 161 of the support substrate 16 and the edge surface 111 of planar optical substrate 11 are aligned to form a single planar surface. At times, planar optical substrate 11 and support substrate 16 are fixed to each other, for example by an adhesive. Additionally or alternatively, the two substrates may be attached or fixed by other means, including use of mechanical fastening means and/or by virtue of having structurally matching surfaces and/or by applying force on both substrates to hold them together.

As shown in FIGS. 3C and 3D a tube 13 is formed around lumen 14 is provided. Edge surface 15 of tube 13 is brought to an aligned position with edge surface 111 of planar optical substrate 11 (not shown in FIG. 3D), thereby defining an interface 30 between them. An aligned position is a position wherein a cross section of lumen 14 at edge surface 15 is aligned with optical aperture 121 of waveguide 12. In such alignment a centroid of the cross section of tube 13's lumen at edge surface 15 may be aligned with optical aperture 121 thus aligning the core of optical fiber 31 with the optical aperture. Interface 30 may also extend between edge surface 15 of the tube and edge surface 161 of support substrate 16.

The aligned position may be determined by use of an optical fiber as exemplified in Steps 41 and 43-45 of FIG. 4. An optical fiber 31 is positioned in tube 13 (FIG. 3C; Step 41), ending at tip 311 of the optical fiber ferrule. Tip 311 is brought very near edge surface 111 or even into abutting contact therewith. Tube 13 may be distanced from edge surface 111 at this time. Efficient light transfer between waveguide 12 and optical fiber 31 requires that the tip 311 be well aligned with optical fiber core.

To assess the light transfer, optical fiber 31 in tube 13 is aligned with the optical aperture 121. Light (e.g. laser light) is then directed via optical fiber 31 and waveguide 12, either from end 'a' of the optical fiber to end 'b' of the waveguide, or vice versa, and the light emitted upon exit may be measured (Step 43). This allows the determination of a property of light transfer associated with the transfer of light between the optical fiber and waveguide, for example power or loss.

If the light transfer property is above a predetermined threshold (e.g. a power of at least −3 dBm or even at least −3.5 dBm or a loss of −5 dB or less, or even a loss of −6 dB or less), the position may be selected for fixing the tube. Alternatively or additionally, light transfer is measured for a plurality of positions by moving the planar optical substrate 11 and tube 13 respective each other (Step 44) and repeating light transfer and measurement (Step 43). To this end, a smart scanning algorithm may be applied to control the movement of optical substrate 11 and tube 13 respective each other, with light transfer being measured during movement and/or at a plurality of respective positions. Such an algorithm may be controlled by feedback from the sensed light transfer. For example, directions of movements which display increased light transfer are continued whilst if a movement reduces light transfer, the movement is canceled and the system is returned to the previous position.

Amongst the plurality of respective positions one having a measured property of light transfer above the predetermined threshold (e.g. lower loss or higher power intensity than 75% or more of the tested positions), or even the lowest loss or highest power intensity amongst a plurality of tested positions, may be selected for fixing. At times the selected position is one that is both above a predetermined threshold and has the lowest loss or highest power amongst a plurality of tested positions is selected (Step 45).

Once an aligned position is selected, tube 13 may be fixed to planar optical substrate 11 at interface 30 (see Step 46 and FIG. 3D). When the position is selected with tube 13 distanced from planar optical substrate 11 and only the tip 311 of optical fiber 31 is in contact with edge surface 111, the tube may be moved along the ferrule of optical fiber 31 such that the tube will come to abutting contact with edge surface 111 of planar optical substrate 11, and then be held there in position for fixing, for example by holding the ferrule of optical fiber 31 firmly together with planar optical substrate 11.

This fixing may be performed by any method known in the art, including for example application of an adhesive also known as a binding agent. One example for the binding agent is a UV cured adhesive. The adhesive may be for example an adhesive that has a liquid phase. The liquid may be applied to interface 30 as in the direction of arrow 131 in FIG. 3D. Upon depositing the adhesive in the interface, the adhesive may be cured using UV light for a desired period of time (e.g. until curing is complete). A non-limiting example for a commercially available adhesive that may be useful in some embodiments is OPTIDYNE™ UV1100 (by Daikin). Once tube 13 is fixed to edge surface 111, the ferrule and optical fiber 31 may be removed. Once removed, this ferrule and optical fiber 31 may be reused in additional attaching processes.

It may be desired to ensure that the adhesive will be absent from an area of edge surface 111 surrounding aperture 121 and being within a cross section of lumen 14 of tube 13. One method of controlling the location of the adhesive is by utilizing the roughness of the tube's surface area at edge surface 15. This surface is at times diced by a laser drilling method during manufacture of the tube. By avoiding the polishing of this surface or by avoiding extensive polishing, the surface may remain rough. This roughness at surface 15 may have for example an index of roughness of between 5 and 15 μm, or between 8 and 12 μm or about 10 μm.

By selecting an adhesive having appropriate viscosity and (optionally) selecting an applied amount, it is possible to ensure that the adhesive applied will become located solely (or mostly) within interface 30 as depicted by arrows in FIG. 3D. The appropriate viscosity may be a viscosity that is matched to the degree of roughness of the tube's edge surface so that the adhesive is drawn (e.g. by capillary action) to flow between, and substantially only between, the edge surface of the tube and the edge surface of the substrate.

In the case of very low viscosity, the adhesive might flow down and cover portions of edge surface 111 that are within the cross section of lumen 14 (or even cover aperture 121) thereby hindering the optical fiber connected to coupling tube 13 from efficient optical coupling with waveguide 12. Using an adhesive with a viscosity that is too high might prevent flow of the adhesive to fill a substantial portion of the interface 30. It is noted that if the roughness of the tube is matched with the viscosity of the adhesive, a capillary effect may at times be observed allowing the adhesive to be drawn into the interface. For some applications, an adhesive viscosity between 200-300 mPa·s when applied may be appropriate. The predetermined amount of the adhesive may be imprecisely measured (e.g. a single drop or droplet at a diameter of about 100 μm) or set to be in the range of $0.5 \cdot 10^{-4}$ μl–$5 \cdot 10^{-4}$ μl or about $1.6 \cdot 10^{-4}$ μl (e.g. precisely provided by an adhesive dispenser). In some cases, if the viscosity is too high, the adhesive might not flow into and fill the spaces between the rough tube surface 15 and the edge surfaces 111 and 161 of the planar optical substrate 11 and support substrate 16, respectively, while a viscosity that is too low might cause the adhesive to flow into a portion of edge surfaces 111 and 161 which is within the circumference of tube 13's cross section.

Figure 5:
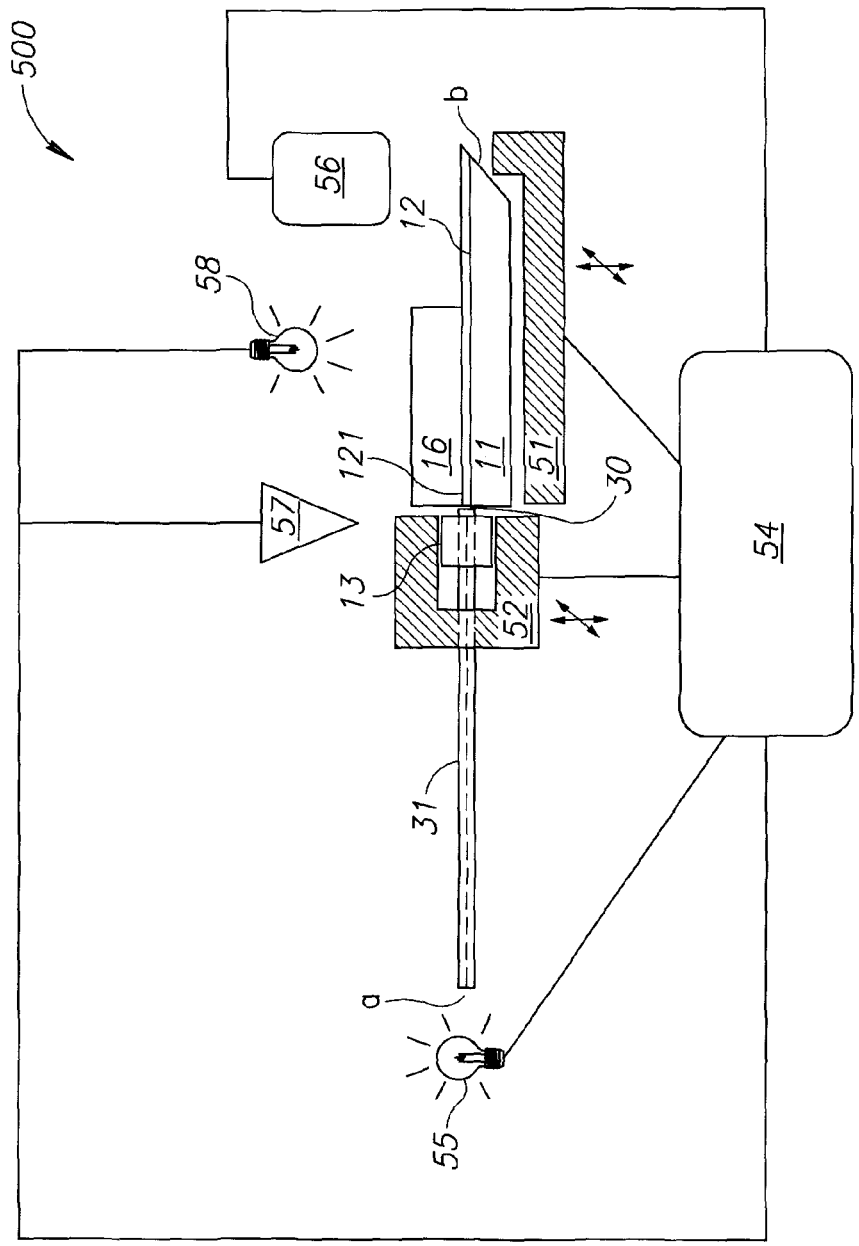
FIG. 5 (appears after FIGS. 6A-6E) schematically shows a device for providing a PLC with an optical connector.

Attention is now drawn to FIG. 5, schematically depicting a system 500 for providing a PLC with a coupling tube. As seen in FIG. 5, a planar optical substrate 11 is held by a support member 51 (for example a jig configured to secure the optical substrate). Tube 13, having an optical fiber 31 positioned in it is held by support member 52 (for example a jig configured to secure the tube). One or more of support member 51 and support member 52 is moveable with respect to the other such that planar optical substrate 11 and tube 13 may be positioned in one or more positions respective each other.

This movement may be performed manually or controlled by a controller 54. When positioned in an aligned position, optical fiber 31 and waveguide 12 allow light transfer between tip 'a' and tip 'b'.

Light source 55 is then used to direct light at one of tip 'a' or tip 'b' and sensor 56 is positioned near the other tip to measure the transferred light. This information is used to measure a property of the light transfer between the tips. The measured property may be any property useful to assess the efficiency of light transfer between the optical fiber and the waveguide, including for example, power intensity and loss.

Based on this measure at one or more different respective positions of planar optical substrate 11 and tube 13 a position for fixing the tube to the substrate is selected, essentially as detailed in the above methods. The movement of the support member 51 and/or 52 and/or the selecting of a position for fixing may be performed manually by an operator reading an output of the system or automatically dictated by controller 54.

Once a position is selected, dispenser 57 may be actuated to deposit a measured amount of adhesive at interface 30. When the adhesive is in the desired location in the interface UV light 58 is used to cure the adhesive thereby fixing the tube to planar optical substrate 11. These steps as well may be performed manually and/or controlled by controller 54.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

In the discussion, unless otherwise stated, adjectives such as "substantially", "essentially" and "about" modifying a condition or relationship characteristic of a feature or features of an embodiment of the invention, are understood to mean that the condition or characteristic is defined to within tolerances that are acceptable for operation of the embodiment for an application for which it is intended.

Descriptions of embodiments of the invention in the present application are provided by way of example and are not intended to limit the scope of embodiments of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A planar lightwave circuit (PLC) comprising:
a planar optical substrate having an edge surface and comprising an optical waveguide having an optical aperture located on the edge surface; and
a tube formed having a lumen dimensioned to receive an optical fiber ferrule, and an edge surface fixed to the substrate edge surface so that a cross section of the lumen at the edge surface of the tube is aligned with the optical aperture.

2. The PLC of claim 1, wherein the edge surface of the tube has a roughness characterized by an index of roughness between 5 μm and 15 μm.

3. The PLC of claim 2, wherein the index of roughness is about 10 μm.

4. The PLC of claim 1, wherein the tube is fixed to the edge surface of the planar optical substrate by an adhesive having a viscosity at the time of application that is matched to a roughness of the edge surface of the tube.

5. The PLC of claim 2, wherein the matching viscosity is between 200-300mPa·s.

6. The PLC of claim 1, wherein the tube is fixed to the edge surface of the planar optical substrate by an adhesive such that at least a portion of the edge surface of the planar optical substrate within the cross section of the tube's lumen and adjacent the optical aperture is essentially devoid of the adhesive.

7. The PLC of claim 6, wherein the edge surface of the planar optical substrate within the cross section of the tube's lumen and adjacent the optical aperture is essentially devoid of the adhesive.

8. The PLC of claim 1 and comprising a support substrate attached to the planar optical substrate such that an edge surface of the support substrate forms an extension of the edge surface of the planar optical substrate.

9. The PLC of claim 8, wherein the tube is fixed to the edge surface of the support substrate.

10. A method for coupling an optical connector to a planar lightwave circuit (PLC) comprising an optical substrate having an edge surface and an optical aperture thereon, the method comprising:
providing a tube formed having a lumen dimensioned to receive an optical fiber ferrule;
positioning the tube and the planar optical substrate respective each other at an aligned position wherein an edge surface of the tube is facing the edge surface of the planar optical substrate such that a cross section of the lumen at the edge surface of the tube is aligned with the optical aperture; and
fixing the tube to the edge surface at the aligned position.

11. The method of claim 10, wherein providing a planar optical substrate includes attaching a support substrate to the planar optical substrate such that an edge surface of the support substrate forms an extension of the edge surface of the planar optical substrate.

12. The method of claim 10, wherein fixing the tube to the edge surface of the planar optical substrate at the aligned position comprises applying an adhesive to an interface zone between the tube and the edge surface of the planar optical substrate, wherein the adhesive has a viscosity that is matched to the roughness of the edge surface of the tube at the interface zone such that when the adhesive is applied to the interface zone the adhesive is drawn into the interface zone.

13. The method of claim 10, wherein the adhesive has a viscosity between 200-300 mPa·s when applied.

14. The method of claim 10, wherein positioning the tube and the planar optical substrate respective each other at an aligned position comprises:
positioning an optical fiber having an optical fiber ferrule in the lumen of the tube;
placing the tube and planar optical substrate at one or more positions respective each other wherein a tip of the ferrule is aligned with the optical aperture in the edge surface of the planar optical substrate; and
directing light through one end of the optical fiber and waveguide to the other end and measuring a property of light transfer to the other end for each of the one or more positions.

15. The method of claim 14, wherein positioning the tube and the planar optical substrate respective each other at an aligned position comprises selecting a position among the plurality of positions according to the measured property of light transfer.

16. The method of claim 15, wherein the selected position is a position measured to have the measured property of light transfer greater than a predefined value.

17. The method of claim 15, wherein the property of light transfer is power intensity and the selected position is a position measured to have a power intensity greater than each of at least 75% of the positions at which the property of light transfer is measured.

18. The method of claim 14, wherein positioning the tube and planar optical substrate respective each other in a plurality of positions comprises moving them respective each other in accordance with an algorithm designed to select a position measured to have a greater optical intensity than each of a plurality of measured positions.

19. The method according to claim 10, wherein said planar optical substrate measures between 0.5 mm and 2 mm in at least one cross section perpendicular to the planar surface of the planar optical substrate.

20. The method according to claim 10, wherein after fixing the tube to the edge surface at the aligned position the PLC is configured to allow at least one of easy attachment and easy detachment of an optical fiber to the waveguide via the tube.

* * * * *